United States Patent

Haugh

[15] 3,666,702
[45] May 30, 1972

[54] INHIBITION OF CRYSTALLIZATION OF LIQUID EPOXY RESINS

[72] Inventor: John C. Haugh, Coon Rapids, Minn.
[73] Assignee: General Mills Chemicals, Inc.
[22] Filed: Oct. 12, 1970
[21] Appl. No.: 80,199

[52] U.S. Cl. ..................................260/29.2 EP, 260/47 EP
[51] Int. Cl. ...................................C08g 53/00, C08g 30/14
[58] Field of Search............260/584, 29.2 EP, 47 EP, 47 EN

[56] References Cited

UNITED STATES PATENTS

| 3,051,681 | 8/1962 | Partansky | 260/47 EP |
| 3,477,981 | 11/1969 | De Hoff et al. | 260/31.2 R |

FOREIGN PATENTS OR APPLICATIONS

| 1,137,863 | 11/1962 | Germany | 260/47 EN |

Primary Examiner—Julius Frome
Assistant Examiner—Arthur H. Koeckert
Attorney—Anthony A. Juettner, Patrick J. Span and William C. Babcock

[57] ABSTRACT

Liquid epoxy resins are stabilized against crystallization at ambient temperatures by combining therewith a crystallization inhibiting amount of 2-amino-2-ethyl-1,3-propanediol.

7 Claims, No Drawings

INHIBITION OF CRYSTALLIZATION OF LIQUID EPOXY RESINS

This invention relates to liquid epoxy resins and their stabilization against crystallization. This stabilization or inhibition of crystallization is accomplished by combining with the liquid epoxy resin a small, but effective, amount of 2-amino-2-ethyl-1,3-propanediol.

It is known that liquid epoxy resins now supplied have a tendency to crystallize on standing at ambient temperatures. This tendency is increased by storage under fluctuating temperature conditions and the introduction of solvents, reactive diluents and fillers. Recently, aqueous emulsions of epoxy resins have found wide application. The introduction of water into the liquid epoxy resins has greatly increased the tendency to crystallization and presently known inhibitors have not been satisfactorily effective, particularly in the aqueous systems.

The problem of crystallization of the diglycidyl ethers of bisphenol A has been recognized in the art. U.S. Pat. No. 3,051,681 discloses the use of a polyglycidyl ether of a novolak resin containing 2-5 phenolic hydroxyl groups as a crystallization inhibitor. This method has the disadvantage of requiring relatively large amounts of the inhibitor. Continued research efforts for more effective crystallization inhibitors can be further seen from U.S. Pat. No. 3,477,981, which employs tris(hydroxymethyl) amino methane as a crystallization inhibitor. This inhibitor has the disadvantage of darkening the epoxy resin particularly if overheating takes place during blending of the liquid epoxy resin and inhibitor.

The inhibitor of the present invention has been found to be a more effective epoxy crystallization inhibitor than those additives presently in common use and is effective to stabilize aqueous emulsions of the epoxy resin against crystallization. The inhibitor is more effective in formulated epoxy paints than the commonly used stabilizers. In addition, the inhibitor is easy to blend with liquid epoxy resins.

This invention is useful with liquid epoxy resins, the most common of which are the polyglycidyl ethers of polyhydric phenols, such as the diglycidyl ether of 2,2-bis p-hydroxyphenyl propane, (bisphenol A), which resin has the following theoretical structural formula

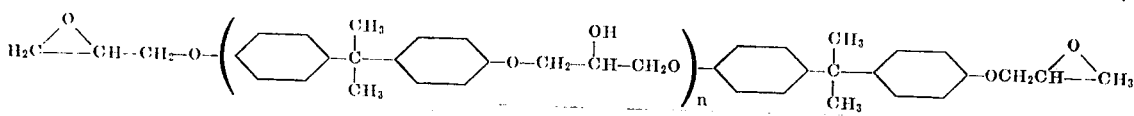

where n is 0 or an integer up to about 2. Generally speaking, n will usually be no greater than 1. However, other types of epoxy resins may be employed. Also included are the reaction products of other polyhydric phenols with polyfunctional halohydrins. Typical polyhydric phenols useful in the preparation of such resins include resorcinol and various bisphenols resulting from the condensation of phenol with aldehydes and ketones such as formaldehyde, acetaldehyde, methyl ethyl ketone, and the like.

Other types of epoxy resins which may be used and which are commercially available epoxy materials are the polyglycidyl ethers of tetraphenols which have two hydroxy aryl groups at each end of an aliphatic chain. These polyglycidyl ethers are obtained by reacting the tetraphenols with polyfunctional halohydrins such as epichlorohydrin. The tetraphenols used in preparing the polyglycidyl ethers are a known class of compounds readily obtained by condensing the appropriate dialdehyde with the desired phenol. Typical tetraphenols useful in the preparation of these epoxy resins are the alpha, alpha, omega, omega-tetrakis(hydroxyphenyl) alkanes, such as 1,1,2,2-tetrakis(hydroxyphenyl) ethane, 1,1,4,4-tetrakis(hydroxyphenyl) butane, 1,1,4,4-tetrakis(hydroxyphenyl)-2-ethylbutane and the like. The epoxy resin reaction product of epichlorohydrin and tetraphenol may be represented by the following theoretical structural formula:

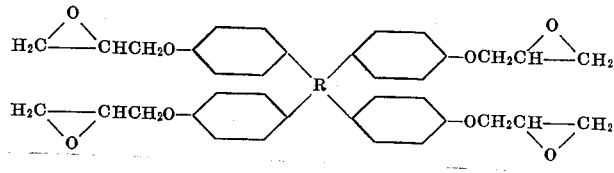

where R is a tetravalent aliphatic hydrocarbon chain having from two to 10, and preferably, from two to six carbon atoms.

In general, the epoxy resins may be described as those having terminal epoxide groups and being liquid at normal room temperature, i.e. about 25° C.

In addition, the epoxy resins may be characterized further by reference to their epoxy equivalent weight, the epoxy equivalent weight of pure epoxy resin being the mean molecular weight of the resins divided by the mean number of epoxy radicals per molecule, or in any case, the number of grams of epoxy equivalent to one epoxy group or one gram equivalent of epoxide. With the most common epoxy resins, the diglycidyl ether of bisphenol A, the liquid resins will have epoxy equivalent weights of about 140–300.

The inhibitor is used in a small amount, generally from 0.02 up to about 3, and more desirably 0.05 to about 1 part per 100 parts of resin (phr.). This amount is sufficient to inhibit crystallization of the epoxy resins at ambient temperatures but insufficient to change significantly the weight per epoxide of the epoxy resin or the physical properties of the resins when cured. The preferred level with the diglycidyl ethers of bisphenol A is about 0.8 phr.

The preferred method of blending the inhibitor with the liquid epoxy resin is to heat the epoxy resin to about 125°C. before adding the inhibitor. The inhibitor which is a liquid blends easily with the liquid epoxy resin. In some instances, the initial mixture may be cloudy but clears as the inhibitor is added or after a short time at the elevated temperature, i.e. about 5 minutes at 125°C. The inhibitor has no effect on the color of the epoxy resin, even if overheating should take place, either due to extended times or higher temperatures, such as 160°C.

As indicated, the inhibitor inhibits crystallization of mixtures of the epoxy resins with water, reactive diluents, solvents and fillers which tend to aggravate the crystallization problem, especially when the mixtures are subjected to fluctuations in temperature. By reactive diluents are meant diluents such as monoepoxides commonly introduced to change the properties of the cured epoxy resins. Such diluents commonly added to the diglycidyl ethers of bisphenol A include monoepoxides such as butyl glycidyl ether, phenyl glycidyl ether, cresyl glycidyl ether, allyl glycidyl ether and gamma-butyral-octane. One commonly used reactive diluent is Epoxide 8 supplied by Procter and Gamble which is a mixture of aliphatic hydrocarbon monoepoxides (monoglycidyl ethers) in which the hydrocarbon group contains from 12–14 carbon atoms. Organic solvents, generally non-reactive with the epoxy resin, which may be used in the preparation of epoxy resins and which tend to induce crystallization include lower aromatic hydrocarbons such as benzene, toluene and xylene; lower aliphatic and cycloaliphatic ketones such as acetone, methyl ethyl ketone, diisobutyl ketone, cyclohexanone and methylcyclohexanone; and aliphatic esters of lower monocarboxylic acids such as ethyl acetate, isopropyl acetate, butyl acetate and the like. Fillers which induce the crystallization include talc, silica, alumina, titanium dioxide and calcium carbonate.

The invention can best be illustrated by means of the following example in which for exemplification one of the most commonly available epoxy resins was employed.

EXAMPLE

A liquid epoxy resin, the diglycidyl ether of 2,2-bis (p-hydroxyphenyl) propane, having an epoxy equivalent weight of about 190, was heated to 125°C. and 0.08 parts by weight per 100 parts epoxy of 2-amino-2-ethyl-1,3-propanediol (AEPD) was hand stirred into the heated epoxy. Initially, the mixture was cloudy but cleared as inhibitor was added. The mixture was maintained at 125°C. for 5 minutes without any effect on color.

For crystallization studies, samples were prepared with a reactive diluent, and water (50 percent solids emulsion). All samples were 100 gram amount samples. Control samples employing no inhibitor and comparison samples containing a conventional inhibitor, tris(hydroxymethyl) aminomethane (THAM) were also prepared.

The samples with reactive diluent were prepared by blending 85 parts of the epoxy resin with 15 parts of reactive diluent (Epoxide 8). There was also added 5 parts of polyoxyethylene sorbitan monolaurate (Tween 20).

The 50 percent solids in water emulsions were prepared by blending equal parts of epoxy resin (with diluent) and water.

In order to shorten or accelerate the crystallization times for the purposes of the test, the samples were seeded with crystals of pure diglycidyl ether of bisphenol A.

In testing for crystallization, the samples were cycled between room temperature (about 25°C.) and 4°C. A typical cycle would be as follows:
 a. at 3:30 p.m., place samples in refrigerator at 4°C.
 b. at 8:00 a.m., remove from refrigerator and allow to come to room temperature (about 25°C.)
 c. at 3:30 p.m., place samples back into the refrigerator.

Each sample was then observed for crystallization on reaching room temperature after removal from the refrigerator. If crystals were observed in any amount, a failure and the time to crystallization was noted.

The results of the tests are as summarized below:
A. Samples of epoxy resin with diluent:
 1. Without inhibitor- crystallized within 4–6 weeks.
 2. With THAM inhibitor (0.08 phr) — began light crystallization at the 13th week.
 3. With AEPD inhibitor (0.08 phr) — showed no crystallization after 13 weeks and test continues.
B. Samples of 50 percent solids emulsion:
 1. Without inhibitor — crystallization in 3–12 days.
 2. With THAM inhibitor (0.08 phr) — crystallization at 2 weeks.
 3. With AEPD inhibitor (0.08 phr) — crystallization at 3.5 weeks. At 0.08 phr of AEPD inhibitor, crystallization was inhibited for 7 weeks.

The embodiments of the present invention in which an exclusive property or privilege is claimed are defined as follows:

1. A crystallization inhibited epoxy resin composition comprising a liquid epoxy resin and a minor amount sufficient to inhibit crystallization of 2-amino-2-ethyl-1,3-propanediol, said minor amount being an amount of about 0.02–3.0 parts by weight per 100 parts of said liquid epoxy resin and wherein said liquid epoxy resin is a poly glycidyl ether of a polyhydric phenol.

2. A composition as defined in claim 1 wherein said liquid epoxy resin is the diglycidyl ether of 2,2-bis(p-hydroxyphenyl) propane.

3. A crystallization inhibited epoxy resin composition comprising an emulsion of a polyglycidyl ether of a polyhydric phenol liquid epoxy resin in water and from about 0.02–3.0 parts hundred parts of resin by weight of 2-amino-2-ethyl-1,3-propanediol.

4. A composition as defined in claim 3 wherein said emulsion comprises about 50 percent concentration by weight of said liquid epoxy resin in water.

5. A composition as defined in claim 3 wherein said epoxy resin is the diglycidyl ether of 2,2-bis(p-hydroxyphenyl) propane.

6. A crystallization inhibited epoxy resin composition comprising a polyglycidyl ether of a polyhydric phenol liquid epoxy resin, a reactive diluent and from about 0.02–3 parts by weight of 2-amino-2-ethyl-1,3-propanediol per 100 parts of said liquid epoxy resin.

7. A composition as defined in claim 6 wherein said liquid epoxy resin is the diglycidyl ether of 2,2-bis(p-hydroxyphenyl) propane.

* * * * *